United States Patent
Barker et al.

(10) Patent No.: US 6,317,660 B1
(45) Date of Patent: Nov. 13, 2001

(54) METHOD FOR USING SATELLITE STATE VECTOR PREDICTION TO PROVIDE SATELLITE SENSOR AUTOMATIC SCAN INHIBIT AND/OR SENSOR SWITCHING

(75) Inventors: Lee A. Barker, San Jose; Xenophon Price, Redwood City, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/578,992

(22) Filed: May 25, 2000

(51) Int. Cl.[7] ................. G05D 1/00; G05D 3/00; G06F 7/00; G06F 17/00; G06F 19/00
(52) U.S. Cl. ................. 701/13; 701/3; 701/4; 701/8; 701/10; 701/13; 701/222; 701/223; 701/226; 701/300; 701/301; 244/164; 244/166; 244/171; 244/176; 342/354; 250/347; 250/353
(58) Field of Search ................. 701/13, 3, 4, 8, 701/10, 226, 222, 300, 301, 223; 244/164, 166, 171, 176; 342/354; 250/347, 353

(56) References Cited

U.S. PATENT DOCUMENTS

| | | | |
|---|---|---|---|
| 4,358,076 * | 11/1982 | Lange et al. | 244/164 |
| 5,109,346 * | 4/1992 | Wertz | 364/459 |
| 5,508,932 * | 4/1996 | Achkar et al. | 364/459 |
| 5,535,965 * | 7/1996 | Surauer et al. | 244/174 |
| 5,742,254 * | 4/1998 | Bassaler | 343/700 |
| 5,783,827 * | 7/1998 | Fallon et al. | 250/347 |
| 5,865,402 * | 2/1999 | Fischer et al. | 244/166 |
| 6,026,337 * | 2/2000 | Krigbaum et al. | 701/13 |
| 6,076,774 * | 6/2000 | Shah et al. | 244/164 |

\* cited by examiner

*Primary Examiner*—William A. Cuchlinski, Jr.
*Assistant Examiner*—Ronnie Mancho
(74) *Attorney, Agent, or Firm*—Kenneth W. Float (57) ABSTRACT

A method for use on a satellite that automatically inhibits scanning of an Earth sensor to handle sensor intrusions by the sun, moon, or other celestial bodies. In implementing the method, a predicted state vector for the satellite, derived from an orbit propagator, is generated. An attitude profile for the satellite is generated. Then, the satellite state (predicted state vector) and attitude profile are processed to determine Earth, sun, and moon vectors in a satellite body frame of reference at any instant. The Earth, sun, and moon vectors are compared to the Earth sensor field of view and sensor field of view limit boxes to determine if scan inhibiting or Earth sensor switching should occur. The affected Earth sensor is inhibited or switched if an intrusion of the sun and/or moon into the field of view of the Earth sensor is predicted.

5 Claims, 6 Drawing Sheets

MOON TRAJECTORIES

Table 1

| EARTH SENSOR COMMAND | SUN SENSOR LOGIC | AUTO-INHIBIT | RESULTING EARTH SENSOR MODE | |
|---|---|---|---|---|
| NORMAL | DUAL | DUAL | NORMAL | ⎫ |
| NORMAL | DUAL | NSI | NSI | ⎬ 1 |
| NORMAL | DUAL | SSI | SSI | ⎭ |
| NORMAL | NSI | DUAL | NSI | ⎫ |
| NORMAL | NSI | NSI | NSI | |
| NORMAL | NSI | SSI | NSI | ⎬ 2 |
| NORMAL | SSI | DUAL | SSI | |
| NORMAL | SSI | NSI | SSI | |
| NORMAL | SSI | SSI | SSI | ⎭ |
| ACQUISITION | DUAL | DUAL | ACQUISITION | ⎫ |
| ACQUISITION | DUAL | NSI | NSI | ⎬ 1 |
| ACQUISITION | DUAL | SSI | SSI | ⎭ |
| ACQUISITION | NSI | DUAL | NSI | ⎫ |
| ACQUISITION | NSI | NSI | NSI | |
| ACQUISITION | NSI | SSI | NSI | ⎬ 2 |
| ACQUISITION | SSI | DUAL | SSI | |
| ACQUISITION | SSI | NSI | SSI | |
| ACQUISITION | SSI | SSI | SSI | ⎭ |
| NSI | DUAL | DUAL | NSI | ⎫ |
| NSI | DUAL | NSI | NSI | |
| NSI | DUAL | SSI | NSI | |
| NSI | NSI | DUAL | NSI | |
| NSI | NSI | NSI | NSI | ⎬ 3 |
| NSI | NSI | SSI | NSI | |
| NSI | SSI | DUAL | NSI | |
| NSI | SSI | NSI | NSI | |
| NSI | SSI | SSI | NSI | ⎭ |
| SSI | DUAL | DUAL | SSI | ⎫ |
| SSI | DUAL | NSI | SSI | |
| SSI | DUAL | SSI | SSI | |
| SSI | NSI | DUAL | SSI | |
| SSI | NSI | NSI | SSI | ⎬ 3 |
| SSI | NSI | SSI | SSI | |
| SSI | SSI | DUAL | SSI | |
| SSI | SSI | NSI | SSI | |
| SSI | SSI | SSI | SSI | ⎭ |

1. AUTO-INHIBIT DETERMINED EARTH SENSOR MODE
2. AUTO-INHIBIT DETERMINED EARTH SENSOR MODE
3. AUTO-INHIBIT DETERMINED EARTH SENSOR MODE

METHOD FOR USING SATELLITE STATE VECTOR PREDICTION TO PROVIDE SATELLITE SENSOR AUTOMATIC SCAN INHIBIT AND/OR SENSOR SWITCHING

BACKGROUND

The present invention relates generally to satellites, and more particularly, to methods that use satellite state vector prediction to automatically inhibit satellite sensor scans and/or provide sensor switching.

The assignee of the present invention has developed a satellite that is to be deployed in a predetermined orbit around the Earth that requires yaw steering in certain circumstances. The orbit is highly inclined and elliptical. A plurality of Earth sensors, one or more sun sensors and a plurality of gyro sensors are employed to control the attitude of the satellite. Certain sensors, in this case the Earth sensor, are sensitive to intrusion by bright bodies such as the sun or the moon in their fields of view.

Such intrusions can lead to loss of attitude control and special precautions must be taken when such an event is predicted to occur. Specifically, for the Earth sensor, the scan experiencing the intrusion must be inhibited and the Earth chord it measures must be captured during the inhibit period in order for the remaining scan to be used to maintain attitude.

In addition, in the elliptical orbit where the Earth apparent radius varies, the captured Earth standard chord must be biased as the Earth radius changes for attitude control. During orbit normal operations of the satellite in this particular orbit, sun intrusions in the Earth sensor occur daily (for low sun angles). In addition to sun intrusions, moon intrusions may be encountered when in orbit normal operations.

When the satellite is operated in yaw steering mode, for low to moderate cases of sun angles, once daily, near satellite local midnight, the sun will follow a trajectory that is centered between north and south scan lines of the Earth sensor. A typical moon intrusion in yaw steering transverses through both Earth sensor scan lines in a very short time period (see FIG. 2). Moon intrusion can be expected to occur every day for four or five days in a row repeating approximately every two weeks.

Thus, the orbit and yaw steering of this satellite produce problems because of the interference of the sun and moon with the Earth sensor scans. Lunar intrusion because of yaw steering can come from any direction several times a week.

Due to the frequency of these intrusion events and the commanding required to perform inhibits manually, it would be desirable to have a method that automatically inhibits Earth sensor scans to eliminate sensor intrusions by the sun, moon, or other celestial bodies. Therefore, it is an objective of the present invention to provide for improved methods that use satellite state vector prediction to automatically inhibit satellite Earth sensor scans and/or provide sensor switching.

SUMMARY OF THE INVENTION

To accomplish the above and other objectives, the present invention is a method (algorithm) that automatically inhibits Earth sensor scans to handle sensor intrusions by the sun, moon, or other celestial bodies. In a preferred embodiment, the present invention comprises firmware that implements two algorithms that predict intrusions of the sun and/or moon into the field of view of the Earth sensor. The algorithms make independent recommendations for inhibiting an affected Earth sensor scan. While the present invention is designed to solve problem associated with the inclined elliptical orbit, it is valid in the geo-synchronous orbit regime as well and may be used to simplify required ground operation during eclipse season of geosynchronous satellites.

The first algorithm comprises automatic scan inhibit logic. The first algorithm takes predictions of sun and moon locations from an orbit propagator and determines if a scan needs to be inhibited. The second algorithm comprises enhanced course alignment sun sensor (ECASS) logic that takes the sun pitch angle from the orbit propagator and a sun roll/yaw measurement from an sun sensor array, for example, to determine if the sun is intruding on one of the Earth sensor scans.

In particular, the method processes the output derived from the orbit propagator as a primary source of satellite state (predicted state vector). In particular, a predicted state vector for the satellite is generated. An attitude profile for the satellite is generated. Then, the satellite state (predicted state vector) and attitude profile are processed to determine Earth, sun, and moon vectors in a satellite body frame of reference at any instant. The Earth, sun, and moon vectors are compared to the Earth sensor field of view and sensor field of view limit boxes to determine if scan inhibiting or sensor switching should occur. The affected sensor is inhibited or switched if an intrusion of the sun and/or moon into the field of view of the sensor is predicted.

If the Earth sensor is not inhibited before sun or moon intrudes on a scan, the satellite will lose Earth lock and is likely to lose attitude control. The present invention predicts when scan inhibits must occur independent of the attitude of the satellite. The present invention thus processes attitude independent state vector products and attitude profile data to calculate attitude dependent state vector products from which the position of the sun and moon in the spacecraft body reference frame is determined, and from which a determination of when to inhibit the Earth sensor is made. When the output generated by the method is within limits (predetermined limit boxes) the Earth sensor is inhibited or switched to prevent loss of satellite lock.

The present invention uses the output of a high-precision orbit propagator on-board the satellite or on the ground as a primary source of satellite state. The present invention uses the satellite state and attitude profile to determine Earth, sun, and moon vectors in the body frame of reference at any instant and compares that to the Earth sensor field of view and sensor field of view limit boxes to determine if a scan inhibit or sensor switch should occur.

The present invention reduces requirements for manual commanding of scan inhibits. The present invention provides real time scan inhibit commanding or sensor switching in highly dynamic cases such as yaw steering where timing of inhibits is critical. The present invention provides the capability to handle varying Earth size in inhibit strategy for other than circular orbits.

The present method autonomously inhibits Earth sensor scans and/or switches sensors. The entry condition is that the ground software predicts an upcoming sun and/or moon intrusion. To avoid unpredictable results from automatic scan inhibits, scan inhibit predictions are performed on a regular basis. This ensures that interferences are not overlooked, and that any required scan inhibit commanding is performed as scheduled.

Practical uses of the present invention include, but are not limited to, prediction and automatic scan inhibiting of Earth sensor scans for impending intrusions by the sun or moon, strategy for handling the potential for simultaneous sun/moon intrusions, and switching logic for selecting between multiple sensors (i.e., star trackers) to avoid the sensor with the intrusion.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
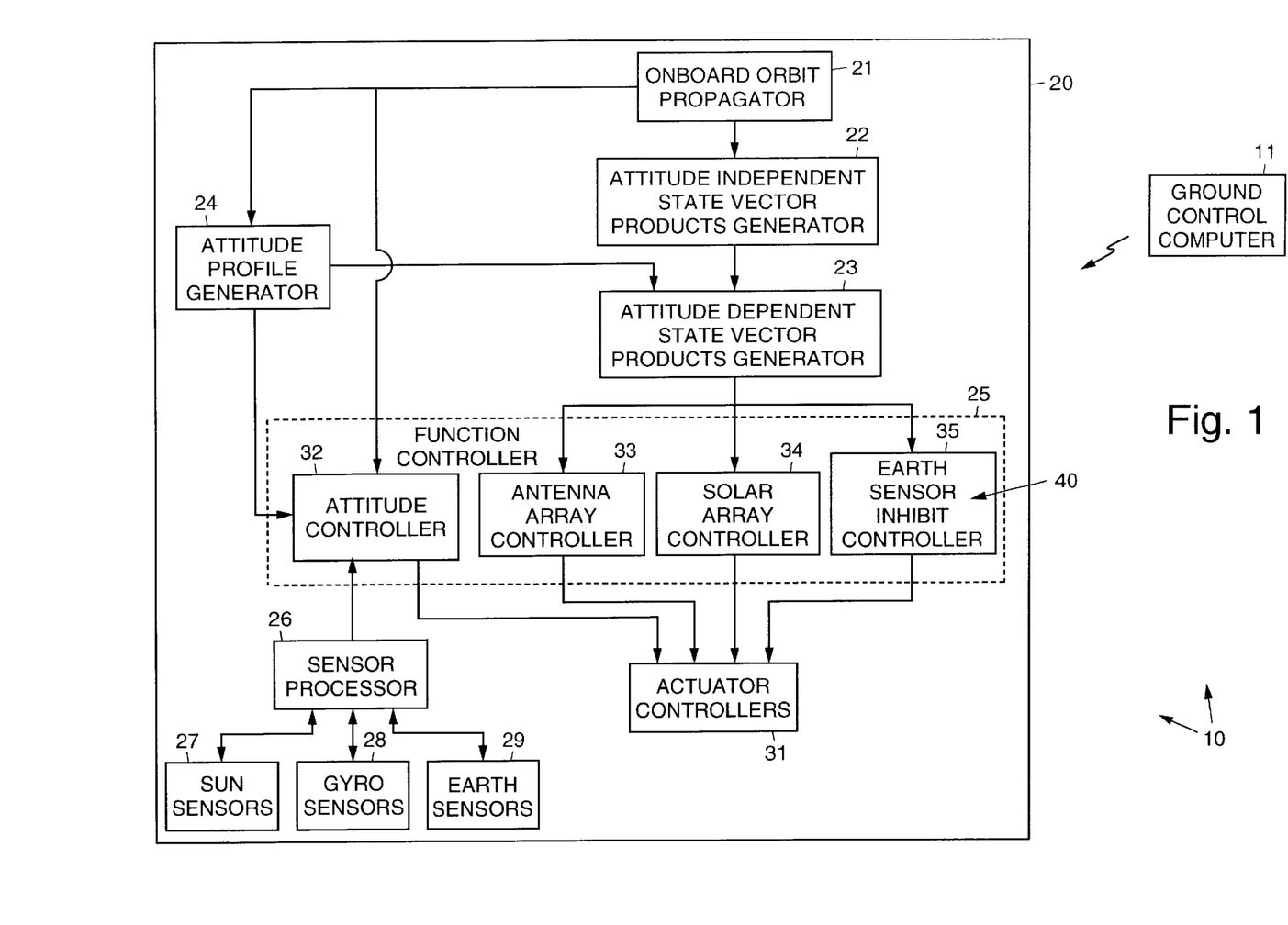
FIG. 1 is a block diagram of an exemplary system in which the present invention is employed.

Referring to the drawing figures, FIG. 1 is a block diagram of an exemplary system 10 in which a method 40 (FIGS. 7 and 8) in accordance with the present invention is employed. This system is disclosed in U.S. patent application Ser. No. 09/516,927, filed Mar. 1, 2000, and which is assigned to the assignee of the present invention. The contents of this patent application are incorporated herein by reference in its entirety.

The system 10 includes a ground control computer 11 that is in communication with an orbiting satellite 20. The satellite 20 comprises an orbit propagator 21, which is coupled to an attitude independent processor 22 (or attitude independent state vector products generator 22) and an attitude profile generator 24. The ground control computer 11 communicates with the satellite to upload an initial state vector and other data, such as satellite properties, and a reference frame, to the orbit propagator 21.

The attitude independent processor 22 and the attitude profile generator 24 are coupled to an attitude dependent processor 23 (or attitude dependent state vector products generator 23). The attitude dependent processor 23, the orbit propagator 21 and the attitude profile generator 24 are coupled to a function controller 25. The function controller 25 includes an attitude controller 32, an antenna array controller 33, a solar array controller 34, and an Earth sensor scan inhibit controller 35. The attitude profile generator 14 and the orbit propagator 21 are coupled to the attitude controller 32.

Although four separate controllers 32–25 are shown, it is to be understood that a single function controller 25 may be employed that performs all of the required control functions. Furthermore, it is to be understood that the function controller 25 or separate controllers 32–25 may be provided in hardware, software or firmware implementations.

The satellite 20 also comprises a sensor processor 26 that receives inputs from one or more sun sensors 27, a plurality of gyro sensors 28 (or Digital Integrated Rate Assemblies (DIRAs)" and one or more Earth sensors 29 (typically north and south Earth sensors 29). The sensor processor 26 is coupled to the attitude controller 32. Outputs of the various controllers 32–25 of the function controller 25 are coupled to a plurality of actuator controllers 31 that control devices coupled thereto. For the purposes of the present invention, one or more of the actuator controllers 31 are coupled to the Earth sensors 29.

The output of the Earth sensor scan inhibit controller 35 generated using the present method 40 controls scan inhibits performed by the Earth sensors 29. During periods of predicted sun or moon intrusion on scans of a particular Earth sensor 29, it is inhibited or another unaffected Earth sensor 29 is used to generate Earth scans.

More specifically, the orbit propagator 21 generates a predicted state vector and outputs it to the attitude independent processor 12 and the attitude profile generator 14. The state vector is a prediction of the desired position and velocity of the satellite 20 at a particular time or epoch.

The attitude independent processor 22 generates a series of second level independent state vector products based on the state vector. The attitude profile generator 24 generates an attitude profile of the satellite 20 and outputs it to the attitude dependent processor 23. The second level independent state vector products generated by the attitude independent processor 22 and the attitude profile generated by the attitude profile generator 24 are input to the attitude dependent processor 23.

The attitude dependent processor 23 generates a series of second level dependent state vector products which are processed by controllers 32–35 for specific satellite functions such as attitude control, solar panel array adjustment, earth sensor scan inhibit timing, momentum management, and antenna pointing. The present method 40 implemented in the Earth sensor scan inhibit controller 35 controls operation of the Earth sensors 29 to inhibit or switch between them during periods of predicted sun or moon intrusion.

Detailed explanations of sun and/or moon intrusion scenarios and how the auto scan logic comprising the present method 40 implemented in the Earth sensor inhibit controller 35 handles these cases are described herein. The exemplary method 40 described herein provides steps to be followed when an operations schedule (orbital path and schedule of attitudes of the satellite 20) output by the orbit propagator 21 predicts a prolonged (greater than 70 minutes) sun and/or moon intrusion. Due to bias limits constraint of the Earth sensor 29 and the Tate of apparent Earth radius change for this orbit, the maximum allowable inhibit with margin for safety is 70 minutes. Maximum scan inhibit duration is enforced by performing yaw avoidance maneuvers.

Figure 2:
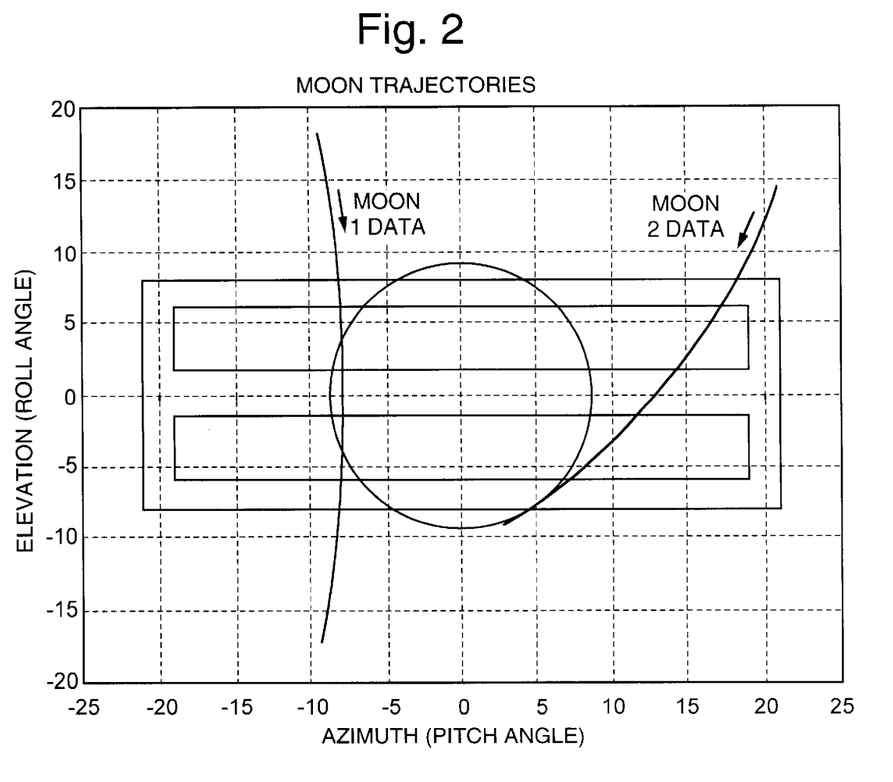
FIG. 2 is a plot that illustrates typical moon intrusions showing two typical independent moon trajectories during yaw steering.

Referring now to FIG. 2, it is a plot that illustrates typical moon intrusions while yaw steering showing two typical independent moon trajectories. During periods of yaw steering, for proper operation, sun intrusions into Earth sensor scans should not occur. During orbit normal operations, however, sun intrusions can occur daily (for sun angles $|\beta|<8°$). When in yaw steering mode, for cases of sun angles $|\beta|<19°$, once daily, near midnight, the sun will follow a trajectory that is centered between north and south scan lines.

As is shown in FIG. 2, a typical moon intrusion transverses through both Earth sensor scan lines. Moon intrusion periods typically occur every day for a period of four or five days repeating approximately every two weeks. During orbit normal operations, in addition to sun intrusions, moon intrusions may be encountered.

Figure 3A:
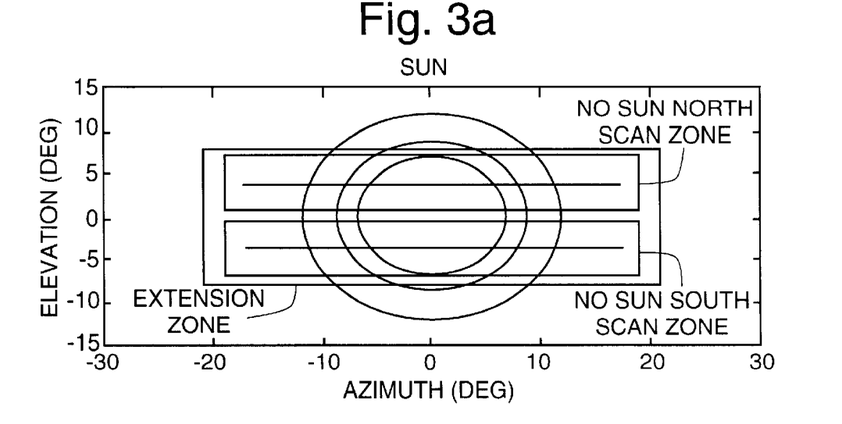
FIGS. 3a and 3b are plots that illustrate sun and moon intrusion and exclusion zones, respectively, for an Earth sensor in normal mode.
Figure 3B:
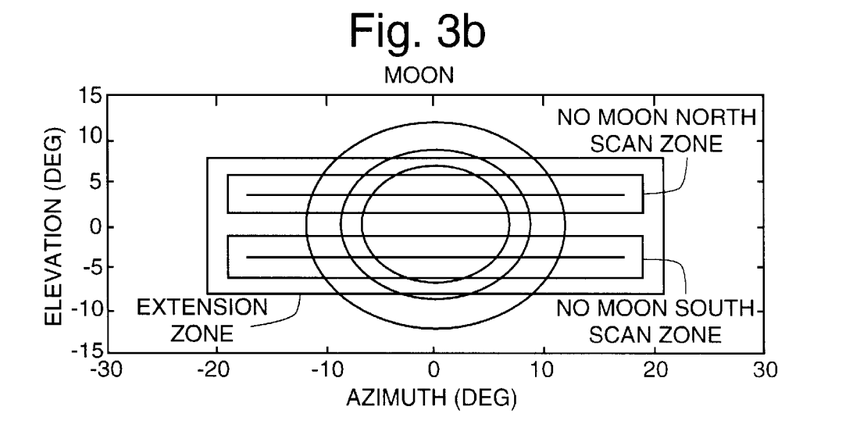

Referring to FIGS. 3a and 3b, they show plots that illustrate sun and moon intrusion and exclusion zones, respectively, for an Earth sensor 29 in normal mode. To accommodate the case where both the sun and the moon are close to the Earth sensor scans, an exclusion zone was designed around the field of view of the Earth sensor 29 as shown in FIGS. 3a and 3b.

The auto scan inhibit feature of the present method 40 has two modes of operation. In the first mode, the method 40 checks for the sun in the exclusion zone first, and then checks for the moon in the exclusion zone (used during orbit normal operations and yaw transitions). In the second mode, the method 40 checks for the moon in the exclusion zone first, and then checks for the sun in the exclusion zone (used during yaw steering operations). In either mode, the auto scan inhibit feature of the present method 40 is capable of making one of three Earth sensor mode recommendations, dual mode, north Earth sensor scan inhibit or south Earth sensor scan inhibit.

The correct auto scan inhibit mode is commanded when the transition to and from yaw steering or orbit normal mode takes place. If the mode is set incorrectly, and two bodies are predicted by the orbit propagator 21 to be within the exclusion zone simultaneously, the auto scan inhibit logic will not perform as desired. For example, if the operational mode was set to moon first with the moon inside the exclusion zone and the sun also moved into one of the scans, a loss of Earth lock would be a likely result. Pitch limits for the exclusion zone and intrusion zones are automatically set for either normal or acquisition mode field of view based on the status of the Earth sensor 29.

The exclusion zone is specifically designed to encompass both the north and south scan regions. The following example illustrates the importance of that configuration.

The auto scan inhibit mode is a sun first mode, which is the nominal case for orbit normal operations. In sun first mode, if the sun is outside the exclusion zone, the scan inhibit method 40 recommends a scan inhibit for the moon if the moon appears in one of the intrusion zones. However, if the sun later comes within the exclusion zone while the method 40 is recommending an inhibit for a moon intrusion, the moon is ignored and the scan inhibit method 40 recommends dual mode even if the moon has not yet cleared out of the intrusion zone. This feature is required to allow the standard chord generated by the Earth sensor 29 to be reset prior to the time that the sun enters the intrusion zone. The present method 40 thereby reduces the chance of extending the total time of intrusion without standard chord reset beyond the maximum roll bias referenced below.

In summary, in sun first mode, moon intrusions are auto-inhibited only when the sun falls outside of the exclusion zone. Analogously, in moon first mode, the sun is auto-inhibited only when the moon falls outside of the exclusion zone.

Scan inhibit bias will now be discussed. Another function of the Earth sensor logic implemented by the method 40 is to compensate for the time-varying apparent Earth radius due to the elliptical orbit that would otherwise create an ever-increasing roll error during scan inhibit. This feature is enabled separately by command.

As observed from the satellite 20, the Earth disk is ever changing in size for an elliptical orbit. When in scan inhibit mode, the Earth sensor 29 compares the chord length of the uninhibited scan to that of a "standard chord" sampled prior to a scan inhibit. However, as the Earth disk changes size, the standard chord is valid only for the moment the scan was actually inhibited. Therefore, a compensation bias is introduced; otherwise, a roll error will quickly develop.

One limitation of the Earth sensor scan inhibit bias function is that a maximum scan inhibit duration of 70 minutes must be enforced. This constraint is related to the maximum roll bias the Earth sensor 29 can endure (±2° with margin) and the rate of change of the Earth disk radius due to elliptical orbit, which is a function of satellite orbit position. If the ±2° bias limit is reached and no action is taken, the satellite 20 will begin to roll at a rate proportional to that of the changing Earth disk radius.

Figure 4:
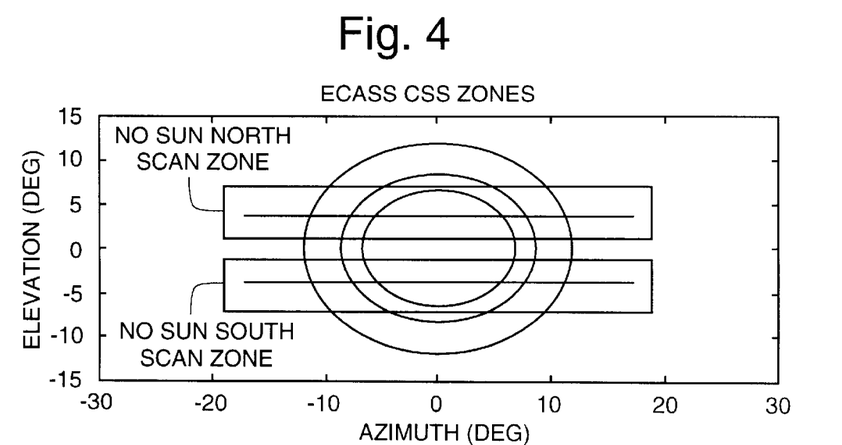
FIG. 4 is a plot that illustrates sun sensor logic zones.

The enhanced course alignment sun sensor (ECASS) logic will now be discussed. If the sun is in the field of view of a sun sensor array, the sun sensor logic determines if the sun pitch (azimuth) and roll (elevation) angle place the sun within the field of view of the Earth sensor 29 and makes an Earth sensor mode recommendation. Since the sun sensor logic relies on sensor data for the roll measurement, the intrusion zones include hysteresis regions in roll. FIG. 4 shows the sun sensor logic zones.

If the sun sensor logic is enabled, it can override recommendations made by the sun-moon intrusion logic according to Table 1. According Table 1, the auto scan inhibit recommendation is used only if the sun sensor logic recommends dual mode. Any scan inhibit recommendation of the sun sensor logic overrides the auto scan inhibit logic. Of course, the sun sensor logic is only useful for sun intrusions. The Earth sensor auto mode logic must be armed for recommendations from either the auto inhibit logic or the sun sensor logic to be acted upon. Ground commanded scan inhibits always override the auto scan inhibit feature.

In summary, the ground logic, the sun sensor logic and the sun-moon intrusion logic make recommendations regarding Earth sensor scan inhibits to the Earth sensor controller. If the recommendations do not agree, Table 1 is used to determine precedence. Auto scan inhibit works when the last ground commanded Earth sensor mode was normal mode or acquisition mode and the Earth sensor auto mode logic is armed.

Figure 5:
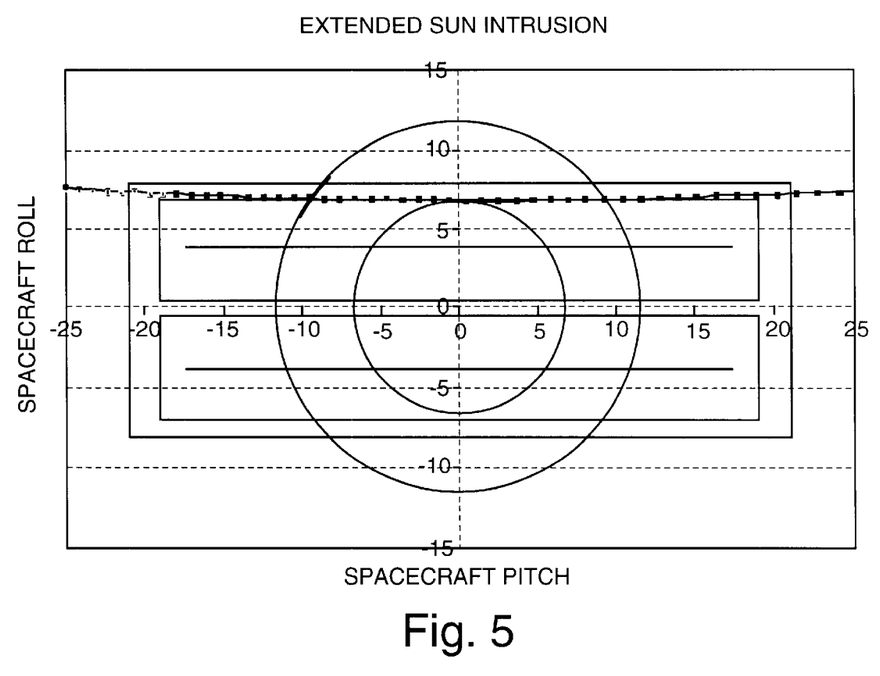
FIG. 5 is a plot that illustrates prolonged sun intrusion.

Intrusions that require ground intervention will now be discussed. Candidate sun and/or moon intrusion scenarios requiring a yaw avoidance maneuver are described below with reference to FIGS. 5 and 6. FIG. 5 is a plot that illustrates prolonged sun intrusion.

The first scenario requiring a yaw avoidance maneuver occurs when there is prolonged sun intrusion during spacecraft orbit normal mode when $|\beta|$ is near 7° and the apparent Earth radius is small (occurs when time of year of orbit normal operations is near winter solstice). The sun intrudes into one of the scans, grazing the Earth, but never being eclipsed by the Earth. The duration of this intrusion can be up to 150 minutes and must be shortened by performing a yaw avoidance maneuver (biasing the satellite 20 in yaw). This scenario occurs around midnight satellite local time where the direction of the yaw bias has negligible impact on power and thermal conditions. The ±15° (could be some other number, this is what we chose with 30 degrees as an alternate) yaw bias will be chosen to minimize the intrusion duration.

Figure 6:
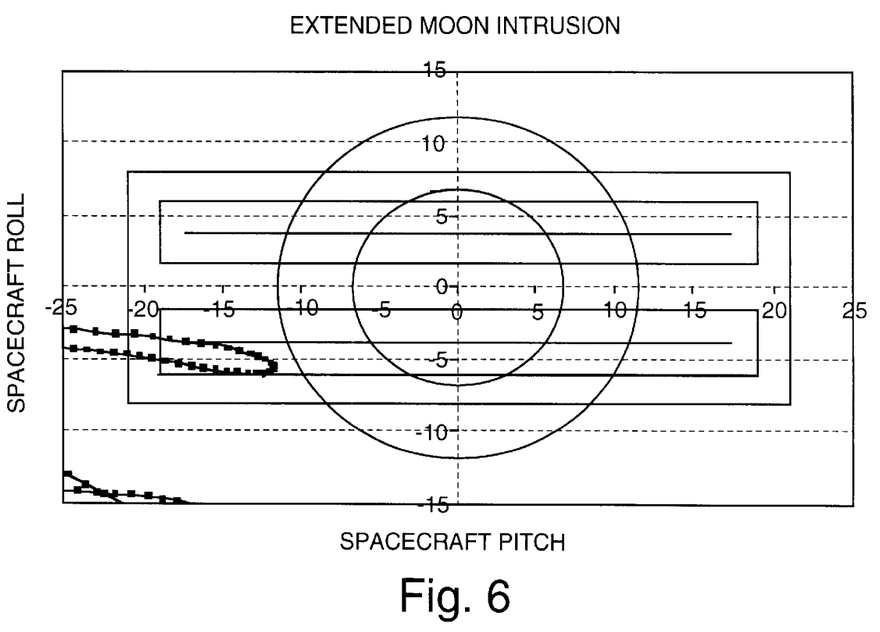
FIG. 6 is a plot that illustrates prolonged moon intrusion.

Referring to FIG. 6, it is a plot that illustrates prolonged moon intrusion in yaw steering at low sun angles. The second scenario requiring a yaw avoidance maneuver occurs when there is a rare, prolonged moon intrusion during spacecraft yaw steering mode (auto scan inhibit in moon first mode) where the moon intrudes into one of the scans, forming a looped trajectory, never moving behind the Earth. This scenario may occur during a full moon when $|\beta|<17°$. Again, a ±15° yaw bias will substantially reduce or eliminate the intrusion duration. Alternatively, remaining in positive orbit normal up to where $|\beta|=17°$ will eliminate this case.

The third scenario requiring a yaw avoidance maneuver occurs when there is a rare occasion of a sun and simultaneous moon intrusion where the sun enters into one of the Earth sensor scan lines and the moon into the other.

In any of the three cases described above, an "All Digital Integrated Rate Assembly (DIRA) mode" (or gryo sensors) option exists which can be used if, for some reason, the yaw avoidance maneuver cannot be configured. In this case, the Earth sensor 29 is disabled and one or more DIRAs 28 (gyro sensors 28 are used before the scan inhibit bias reaches 2° and control is switched back to the Earth sensor 29 shortly after the end of the intrusion.

Figure 7:
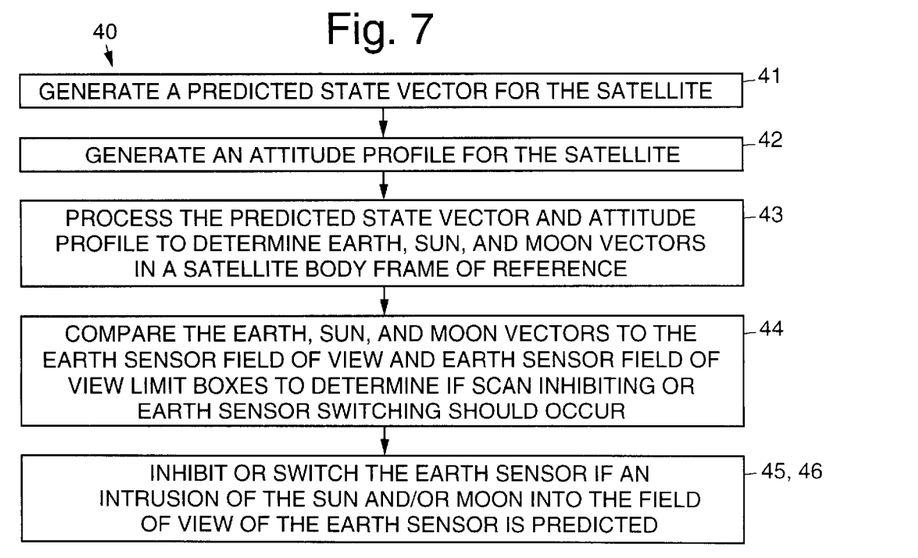
FIG. 7 is a flow diagram that illustrates an exemplary method in accordance with the principles of the present invention that provides Earth sensor scan inhibit operation.

Referring now to FIG. 7, it is a flow diagram that illustrates an exemplary method 40 in accordance with the principles of the present invention that provides Earth sensor scan inhibit operation. The method 40 may be embodied in firmware, for example, that implements two algorithms that predict intrusions of the sun and/or moon into the field of view of the Earth sensor 29. The algorithms make independent recommendations for inhibiting an affected Earth sensor scan.

The first algorithm comprises automatic scan inhibit logic. The automatic scan inhibit logic processes predictions of sun and moon locations from the orbit propagator 21 (which may be located on-board the satellite 20 or on the ground) to determine if a scan needs to be inhibited. The second algorithm comprises enhanced course alignment sun sensor logic that processes the sun pitch angle from the orbit propagator 41 and a sun roll/yaw measurement to determine if the sun is intruding on one of the Earth sensor scans.

The method 40 processes the output derived from the orbit propagator 21 as a primary source of satellite state (predicted state vector). In particular, a predicted state vector for the satellite 20 is generated 41. An attitude profile for the satellite is generated 42. Then, the satellite state (predicted state vector) and attitude profile are processed 43 to determine Earth, sun, and moon vectors in a satellite body frame of reference at any instant. The Earth, sun, and moon vectors are compared 44 to the Earth sensor field of view and sensor field of view limit boxes to determine if scan inhibiting or Earth sensor switching should occur. The affected Earth sensor 29 is inhibited 45 or switched 46 if an intrusion of the sun and/or moon into the field of view of the Earth sensor 29 is predicted.

Figure 8:
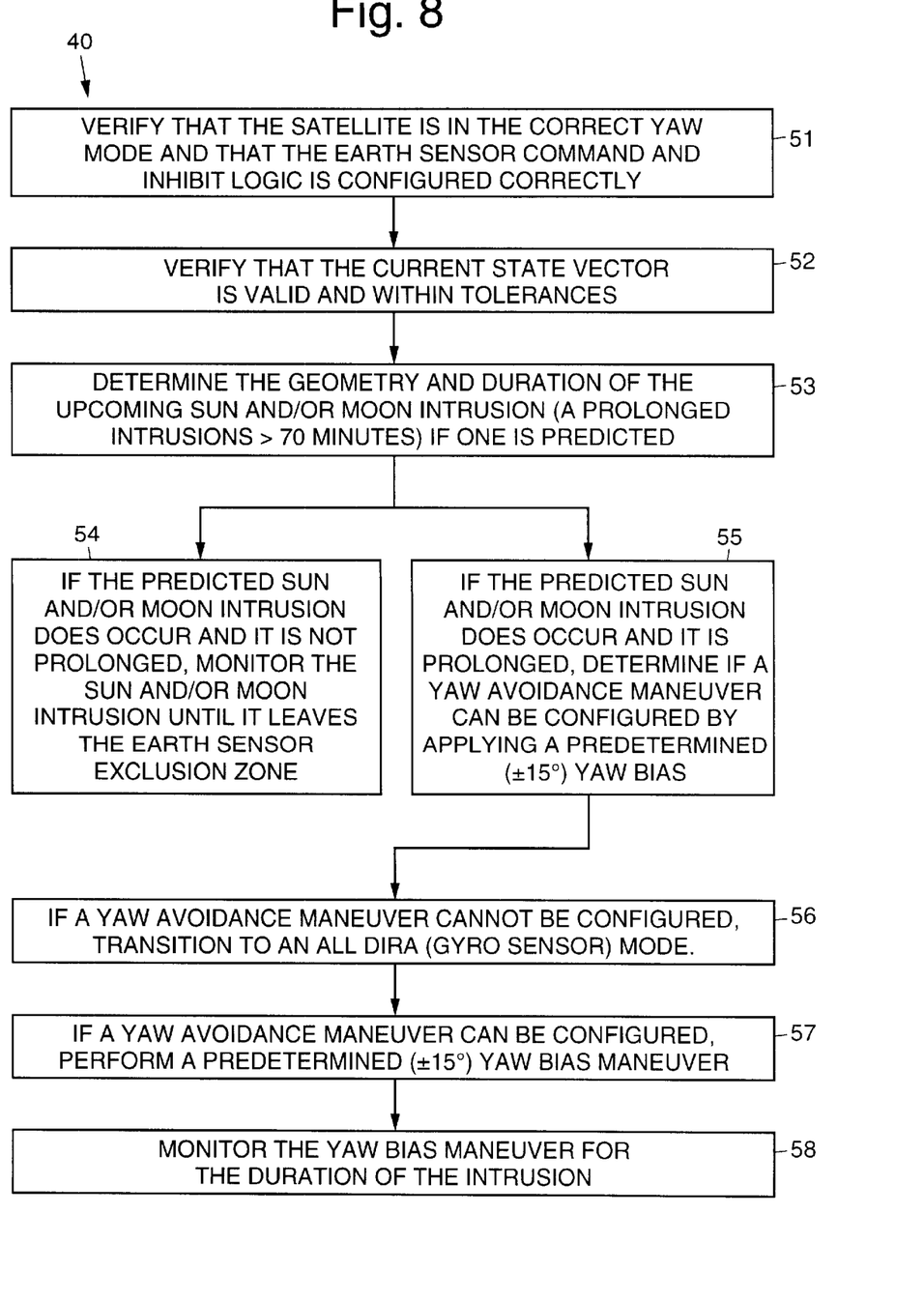
FIG. 8 is a top-level flow diagram that illustrates implementation details of the present method.

Referring now to FIG. 8, it is a top-level flow diagram that illustrates implementation details of the method 40. The entry condition is that the ground control computer 11 predicts an upcoming sun and/or moon intrusion. The first step in the method 40 is to verify 51 that the satellite 20 is in the correct yaw mode and that the earth sensor command and inhibit logic is configured correctly. The Earth sensor auto inhibit mode is selected according to the following table:

| Yaw mode | Earth sensor auto inhibit mode |
|---|---|
| Positive orbit normal | Sun first |
| Negative orbit normal | Sun first |
| Orbit normal +90 degrees | Sun first |
| Orbit normal −90 degrees | Sun first |
| Positive yaw steering | Moon first |
| Negative yaw steering | Moon first |
| Transition between yaw modes or yaw biases | Sun first |

The second step is to verify 52 that the current state vector in the orbit propagator 21 is valid and within tolerances. The third step is to determine 53 the geometry and duration of the upcoming sun and/or moon intrusion (a prolonged intrusion >70 minutes) if one is predicted. A determination is also made if a simultaneous intrusion in both scans is to occur.

If the predicted sun and/or moon intrusion does occur and it is not prolonged, the fourth step is to monitor 54 the sun and/or moon intrusion until it leaves the Earth sensor exclusion zone. If the predicted sun and/or moon intrusion does occur and it is prolonged, the fourth step is to determine 55 if a yaw avoidance maneuver can be configured by applying a predetermined (±15°) yaw bias.

If a yaw avoidance maneuver cannot be configured, the fifth step is to transition 56 to an all DIRA (gyro sensor) mode. If a yaw avoidance maneuver can be configured, the sixth step is to perform 57 a predetermined (±15°) yaw bias maneuver. The seventh step is to monitor 58 the yaw bias maneuver for the duration of the intrusion.

Thus, methods have been disclosed that uses satellite state vector prediction to automatically inhibit satellite sensor scans and/or provide sensor switching. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for use on a satellite that automatically inhibits Earth sensor scans and/or provides Earth sensor switching, comprising the steps of:

generating a predicted state vector for the satellite;

generating an attitude profile for the satellite;

processing the predicted state vector and attitude profile to determine Earth, sun, and moon vectors in a satellite body frame of reference;

comparing the Earth, sun, and moon vectors to Earth sensor field of view and Earth sensor field of view limit boxes to determine if scan inhibiting or Earth sensor switching should occur; and inhibiting or switching the Earth sensor if an intrusion of the sun and/or moon into the field of view of the Earth sensor is predicted.

2. A method for use on a satellite that automatically inhibits Earth sensor scans and/or provides Earth sensor switching, comprising the following steps:

if an upcoming sun and/or moon intrusion is predicted:
verify that the satellite is in the correct yaw mode and that Earth sensor command and inhibit logic is configured correctly;

verify that a current state vector is valid and within tolerances;

determine the geometry and duration of the upcoming sun and/or moon intrusion;

if the predicted sun and/or moon intrusion is not prolonged, monitor the sun and/or moon intrusion until it leaves the Earth sensor exclusion zone;

determine if a yaw avoidance maneuver can be configured by applying a predetermined yaw bias if the intrusion is prolonged;

if a yaw avoidance maneuver cannot be configured, transition to an all gyro sensor mode;

if a yaw avoidance maneuver can be configured, perform a predetermined yaw bias maneuver, and monitor the predetermined yaw bias maneuver for the duration of the intrusion.

3. The method recited in claim 2 wherein the step of determining the geometry and duration of the upcoming sun and/or moon intrusion comprises determining if a prolonged intrusion >70 minutes wil occur.

4. The method recited in claim 2 wherein the step of determining if a yaw avoidance maneuver can be configured is achieved by applying a ±15° yaw bias.

5. The method recited in claim 2 wherein the step of performing a predetermined yaw bias maneuver comprises performing a ±15° yaw bias maneuver.

* * * * *